Figure 1:
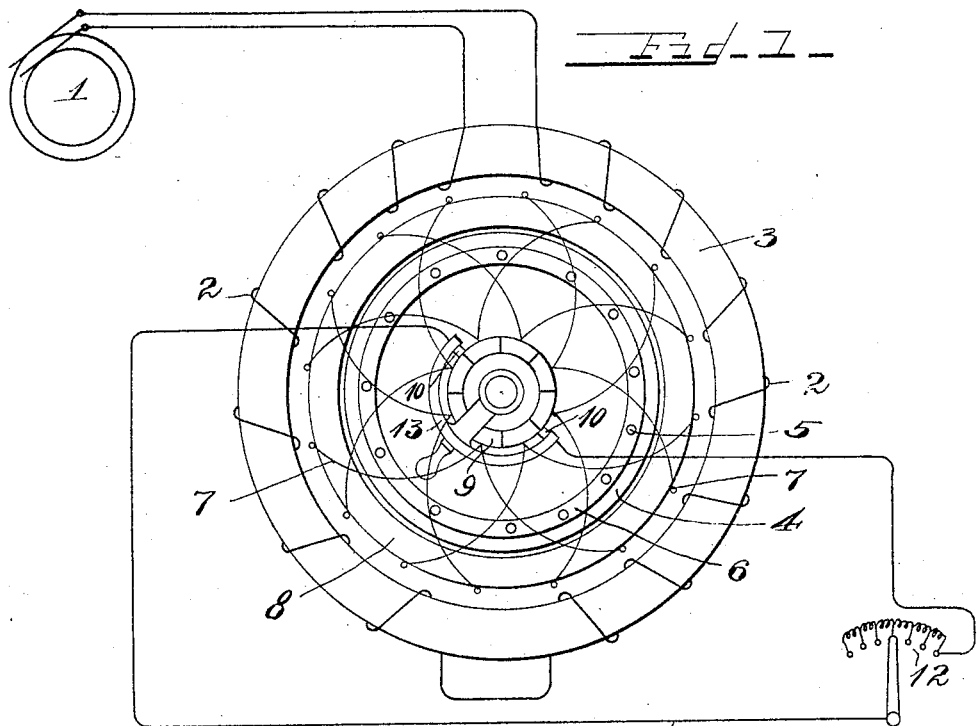

No. 802,451. PATENTED OCT. 24, 1905.
D. C. JACKSON.
ELECTRIC MOTOR.
APPLICATION FILED MAR. 8, 1900. RENEWED JAN. 23, 1905.

Witnesses
Max W. Gabel.
Chas. J. Schmidt.

Inventor
Dugald C. Jackson.
By Charles A. Brown & Cragg
Attorneys

UNITED STATES PATENT OFFICE.

DUGALD C. JACKSON, OF CHICAGO, ILLINOIS.

ELECTRIC MOTOR.

No. 802,451.　　　　Specification of Letters Patent.　　　　Patented Oct. 24, 1905.

Application filed March 8, 1900. Renewed January 23, 1905. Serial No. 242,324.

*To all whom it may concern:*

Be it known that I, DUGALD C. JACKSON, a citizen of the United States, residing at Chicago, in the county of Cook and State of Illinois, have invented a certain new and useful Improvement in Electric Motors, (Case No. 5,) of which the following is a full, clear, concise, and exact description, reference being had to the accompanying drawings, forming a part of this specification.

My invention relates to alternating-current motors, and more particularly to induction-motors, and has for its object the provision of improved means for controlling the speed thereof over wide range.

As is well understood, the speed of induction-motors as they are at present constructed is not capable of variation to any great extent, the theoretical maximum speed thereof being limited to synchronism with the rotating field, the amount of deviation therefrom or slippage being dependent upon the load which is placed upon the motor. This variation in speed is usually a very small and frequently an insignificant amount. Induction-motors as at present constructed are therefore not adapted for efficient use in places where variable speed is desired.

It is the prime object of this invention to provide means, in connection with the induction-motor armature, for effecting a speed control thereof through a wide range, as well as to secure efficient operation thereof under all conditions of speed and load.

In my application Serial No. 7,799, filed of even date herewith, I have shown a method of arranging induction-motor windings so that a displacement or readjustment thereof will cause a change of speed of the rotating member of the motor. In the said application speed control is generally effected by changing the relative disposition of the motor-windings with each other. In my present invention I so arrange the induction-motor windings that a speed control of the rotating member thereof is effected, preferably, without changing the relative disposition of the windings.

Generally speaking, my invention consists in providing upon the armature of an induction-motor an ordinary short-circuited induction-motor armature-winding—such, for instance, as a squirrel-cage winding—the winding being under the influence of suitably-energized field-cores, the said cores being preferably wound with the ordinary distributed form of induction-motor winding. In addition to these windings I preferably employ an ordinary repulsion-motor winding consisting, preferably, of a so-called "closed-circuit" type, the said winding being placed independently of the armature-core and preferably between the armature and the field-core and is preferably stationarily mounted. The winding is at intervals connected to a contact-maker, which may preferably be a commutator, the said commutator being preferably fixedly mounted with relation to the said auxiliary winding. I employ contact-completing devices, which may preferably be brushes adapted to bear upon the commutator, and a closed circuit connecting the same, the said circuit including either resistance or reactance, as desired. The speed control of the rotating member is then effected over a wide range, preferably by moving the brushes upon the commutator. Any suitable means for effecting this movement may be employed, thereby accurately governing the speed at which the motor is adapted to operate.

I will explain my invention more in detail by reference to the accompanying drawings, illustrating the preferred embodiment thereof, in which—

Figures 2, 3, 4:
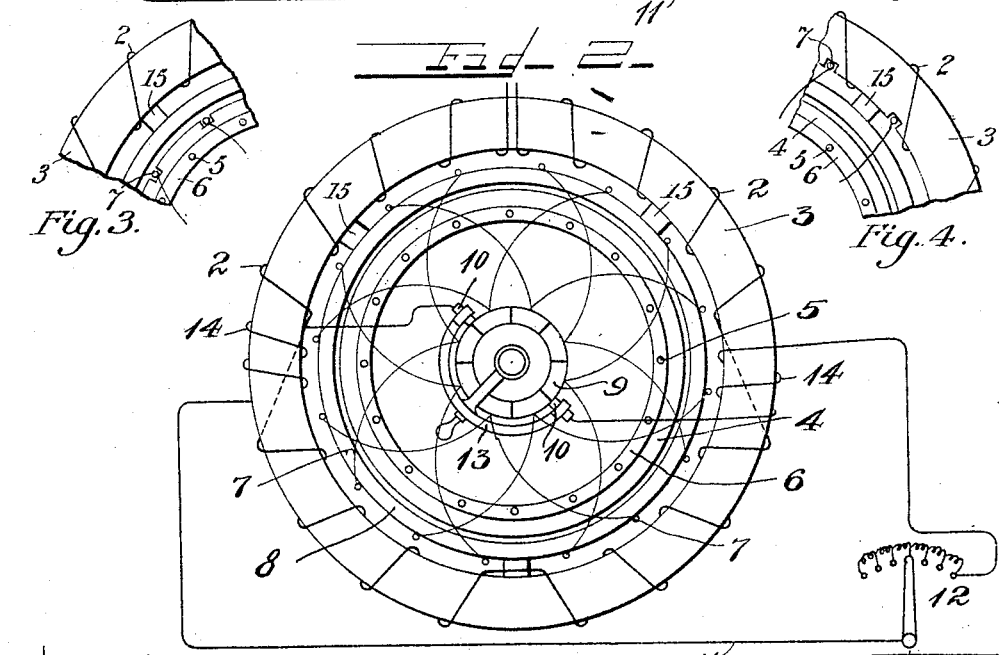

Figure 1 is a diagrammatic view illustrating the arrangement of the motor-circuits, and Fig. 2 shows a modification thereof. Fig. 3 is a segmental view showing a modification of the windings. Fig. 4 is a segmental view showing another modification of the windings.

Like characters of reference indicate like parts in the several views.

Referring now to Fig. 1, I have shown a source of alternating current 1 as supplying current to field-coils 2 2 of an induction-motor 3. The said field-coils may be of any suitable type, the distributed form of winding being herein employed. I have shown an armature 4 of the ordinary induction-motor type as provided with a squirrel-cage winding consisting of conductors 5 and short-circuiting rings 6. This armature is adapted to operate under the influence of the said field-coils 2 2. I associate a second winding in inductive relation with the said armature and field, the said auxiliary winding comprising conductors 7 7, which are in this instance shown as stationarily mounted in a preferably non-magnetic frame 8. The said conductors 7 are connected at intervals to a commutator 9, the said commutator being stationarily mounted relatively to said conductors 7. I employ brushes 10 10, adapted to engage the said commutator, the brushes being included in a closed circuit 11, (shown in this instance as including a reactance 12.) The constructions as shown are of course diagrammatic and serve only to show the relative positions of the parts. In the actual construction of the motor the space between the core 3 and core 4 would be very small, similarly to the ordinary induction-motor. The conductors 7 may be laid in this space, as they are preferably so constructed as not to consume a large space, or, if desired, the said conductors might be recessed into the core 3, as shown in Fig. 4. Under some circumstances it might be advantageous to recess said conductors 7 into the armature-core and allow them to travel with said armature-core, as shown in Fig. 3. The winding 7 under some circumstances would act as a short-circuited secondary to the field-windings, and therefore would reduce the amount of magnetism passing through the armature. The control of the motor is by means of varying the amount of current and the relative position of its magnetizing effects as it flows in the winding composed of conductors 7. I have provided a handle 13, rotatably mounted with respect to the commutator, the said handle serving to adjust the angular position of the brushes upon the commutator. The movement of the brushes about the commutator changes the speed of operation of the armature, and I am thereby enabled to secure an effective and accurate control of the speed of the said armature through a wide range.

In Fig. 2 I have shown another embodiment in which the closed circuit 11 includes coils 14 14, placed upon the field-core, the said coils 14 14 serving in a measure as secondary windings. The said coils, as stated, act in part as secondary coils to the field-coils 2 and have currents induced therein, thus increasing the amount of current flowing in the auxiliary winding. The operation of this embodiment is practically identical to the operation of the apparatus shown in Fig. 1. I have in Fig. 2 also shown the core 8 as stationarily mounted with respect to the core 3, which would be the preferred form in which the motor is employed, and to retain the core in position I have shown sectors 15 15 uniting said cores.

I have herein shown and particularly described the preferred embodiment of my invention; but I do not wish to be limited to the precise construction and arrangement herein shown, as modifications thereof may readily be made by those skilled in the art without departing from the spirit thereof; but,

Having thus described my invention, I claim as new, and desire to secure by Letters Patent, the following:

1. In an induction-motor, the combination with field-windings, of an armature in inductive relation therewith, an auxiliary winding independent of said armature and field-windings, receiving its current from said field-windings interposed between said armature and said field-windings and adapted to modify the magetizing effect of said field-windings, a commutator and brushes for the said auxiliary winding, and means for changing the position of said brushes about the said commutator, substantially as described.

2. In an induction-motor, the combination with field-windings, of an armature in inductive relation therewith, an auxiliary stationary winding independent of the said armature and field-windings, interposed between the said field-windings and the said armature; said winding being adapted to move relatively to the said armature and inductively receiving its current from said field-windings, a commutator and brushes for the said auxiliary winding, and means for changing the position of the said brushes about the said commutator, substantially as described.

3. In an induction-motor, the combination with field-windings, of an armature in inductive relation therewith, a stationary closed-circuit winding independent of the said armature and field-windings, interposed between the said field-windings and the said armature; said winding being adapted to move relatively to the said armature and inductively receiving its current from said field-windings, a commutator and brushes for the said stationary winding, and means for changing the position of the said brushes about the said commutator, substantially as described.

4. In an induction-motor, the combination with field-windings, of an armature in inductive relation therewith, an auxiliary winding independent of the said armature and field-windings, interposed between the said field-windings and the said armature said winding being adapted to move relatively to the said armature and inductively receiving its current from said field-windings, a commutator and brushes for said auxiliary winding, a closed circuit including the said brushes, and means for changing the position of the said brushes about the said commutator, substantially as described.

5. In an induction-motor, the combination with field-windings, of an armature in inductive relation therewith, an auxiliary stationary winding independent of the said armature and field-windings, interposed between the said field-windings and the said armature; said winding being adapted to move relatively to the said armature and inductively receiving its current from said field-windings, a commutator and brushes for the said auxiliary stationary winding, a closed circuit including the said brushes, and means for changing the position of the said brushes about the said commutator, substantially as described.

6. In an induction-motor, the combination with field-windings, of an armature in inductive relation therewith, a stationary closed-circuit winding independent of the said armature and field-windings, interposed between the said field-windings and the said armature; said winding being adapted to move relatively to the said armature and inductively receiving its current from said field-windings, a commutator and brushes for the said stationary closed-circuit winding, a closed circuit including the said brushes, and means for changing the position of the said brushes about the said commutator, substantially as described.

7. In an induction-motor, the combination with field-windings, of an armature in inductive relation therewith, a stationary closed-circuit winding independent of the said armature and field-windings, interposed between the said field-windings and the said armature said winding being adapted to move relatively to the said armature and inductively receiving its current from said field-windings, a commutator and brushes for the said stationary closed-circuit winding, a closed circuit including said brushes, the said closed circuit also including auxiliary field-windings, and means for changing the position of the said brushes about the said commutator, substantially as described.

8. In a single-phase induction-motor, the combination with field-windings, of an armature in inductive relation to said field-windings, an auxiliary winding adapted to move relatively to the said armature-windings, interposed between said armature and said field-windings and receiving its current by induction from said field-windings and means for changing the magnetic axis of the said auxiliary winding, substantially as described.

9. In a single-phase induction-motor, the combination with field-windings, of an armature in inductive relation to said field-windings, an auxiliary winding also receiving its current inductively from the said field-windings, interposed between the said field-windings and the said armature adapted to move relatively to the said armature-windings, and means for changing the magnetic axis of the said auxiliary winding, substantially as described.

10. In an induction-motor, the combination with field-windings, of an armature in inductive relation therewith, an auxiliary winding independent of the said armature and field-windings, said winding being adapted to move relatively to the said armature, circuit-closing means for said auxiliary winding, and means for changing the interconnections between the said auxiliary winding and the said circuit-closing means, substantially as described.

11. In an induction-motor, the combination with field-windings, of an armature in inductive relation therewith, an auxiliary stationary winding independent of the said armature and field-windings, said winding being adapted to move relatively to the said armature, circuit-closing means for said auxiliary winding, and means for changing the interconnections between the said auxiliary winding and the said circuit-closing means, substantially as described.

12. In an induction-motor, the combination with field-windings, of an armature in inductive relation therewith, a stationary closed-circuit winding independent of the said armature and field-windings, said winding being adapted to move relatively to the said armature, circuit-closing means for said auxiliary winding, and means for changing the interconnections between the said auxiliary winding and the said circuit-closing means, substantially as described.

13. In an induction-motor, the combination with field-windings, of an armature inductively associated with said field-windings, a direct-current winding provided with a commutator, receiving its current by induction from said field-windings, inductively associated with said armature and said field-windings, and adapted to modify the magnetic effect of said field-windings, thereby to effect the speed of rotation of said armature, and means for varying the amount of current in said direct-current winding, substantially as described.

14. In a single-phase induction-motor, the combination with field-windings, of an armature in inductive relation to said field-windings, an auxiliary winding also receiving its current inductively from the said field-windings interposed between the said field-windings and the said armature, a commutator for said auxiliary winding, and means associated therewith for changing the magnetic axis of the said auxiliary windings, substantially as described.

15. In a motor, the combination with alternating-current energizing field-windings, of an armature, an auxiliary winding interposed between said field-windings and said armature, and means for changing the magnetic axis of said auxiliary winding, substantially as described.

16. In a motor, the combination with alternating-current energizing field-windings, of an armature, an auxiliary winding interposed between said field-windings and said armature, receiving its current inductively from said field-windings, and means for changing the magnetic axis of said auxiliary winding, substantially as described.

17. In an alternating-current induction-motor, the combination with field-windings, of an armature in inductive relation to said field-windings, an auxiliary winding also receiving its current inductively from said field-windings, means for changing the magnetic axis of the said auxiliary winding, and means for varying the amount of current in said auxiliary winding, substantially as described.

18. In an alternating-current induction-motor, the combination with field-windings, of an armature in inductive relation to said field-windings, an auxiliary winding also receiving its current inductively from the said field-windings, a commutator for said auxiliary winding, means associated with said commutator for changing the magnetic axis of the said auxiliary winding, and means associated with the aforesaid means for varying the amount of current flowing through said auxiliary winding, substantially as described.

19. In a motor, the combination with alternating-current energizing field-windings, of an armature, an auxiliary winding inductively associated with said field-winding, means for changing the magnetic axis of said auxiliary winding, and means for varying the amount of current passing through said auxiliary winding, substantially as described.

20. In a motor, the combination with alternating-current energizing field-windings, of an armature inductively associated with said field-windings, an auxiliary closed-circuited winding associated with said field-windings, and means for changing the flow of current through said auxiliary winding, substantially as described.

21. In a motor, the combination with alternating-current energizing field-windings, of an armature inductively associated with said field-windings, an auxiliary closed-circuited winding associated with said field-windings, and receiving its current by induction therefrom, and means for changing the flow of current through said auxiliary winding, substantially as described.

In witness whereof I hereunto subscribe my name this 24th day of February, A. D. 1900.

DUGALD C. JACKSON.

Witnesses:
 FLORENCE WICKLIN,
 MAX W. ZABEL.